US010308513B2

(12) United States Patent
Frohs et al.

(10) Patent No.: US 10,308,513 B2
(45) Date of Patent: Jun. 4, 2019

(54) METHOD FOR PRODUCING GRAPHITE BODIES

(71) Applicant: Showa Denko Carbon Germany GmbH, Meitingen (DE)

(72) Inventors: Wilhelm Frohs, Allmannshofen (DE); Rainer Schmitt, Augsburg (DE)

(73) Assignee: Showa Denko Carbon Germany GmbH, Meitingen (DE)

( * ) Notice: Subject to any disclaimer, the term of this patent is extended or adjusted under 35 U.S.C. 154(b) by 0 days.

(21) Appl. No.: 15/913,293

(22) Filed: Mar. 6, 2018

(65) Prior Publication Data
US 2018/0194631 A1 Jul. 12, 2018

Related U.S. Application Data

(63) Continuation of application No. PCT/EP2016/001877, filed on Nov. 11, 2016.

(30) Foreign Application Priority Data

Nov. 13, 2015 (DE) .................. 10 2015 222 439

(51) Int. Cl.
*C01B 32/205* (2017.01)
*C04B 35/52* (2006.01)
*C04B 35/532* (2006.01)

(52) U.S. Cl.
CPC .......... *C01B 32/205* (2017.08); *C04B 35/522* (2013.01); *C04B 35/532* (2013.01); *C01P 2006/40* (2013.01); *C04B 2235/422* (2013.01); *C04B 2235/616* (2013.01)

(58) Field of Classification Search
CPC ............... C04B 35/522; C04B 35/532; C04B 2235/616; C04B 2235/422; C01B 32/205; C01P 2006/40
USPC ........................................... 423/448
See application file for complete search history.

(56) References Cited

U.S. PATENT DOCUMENTS

| 702,758 A | 6/1902 | Acheson |
| 1,029,121 A | 6/1912 | Héroult |
| 4,534,951 A | 8/1985 | Kortovich et al. |
| 5,705,139 A * | 1/1998 | Stiller .................. C04B 35/532 423/445 R |
| 5,900,189 A * | 5/1999 | Kawano ................ C04B 35/532 252/502 |
| 2013/0004410 A1 | 1/2013 | Johansen et al. |

OTHER PUBLICATIONS

International Search Report dated Feb. 13, 2017 for International Application No. PCT/EP2016/001877 (6 pages).
"The effect of calcination on reactive milling of anthracite as potential precursor for graphite production", Caroline E. Burgess-Clifford et al., Fuel Processing Technology, Elsevier BV, NL, vol. 90, No. 12, pp. 1515-1523, Dec. 1, 2009 (9 pages).
"Anthracite Evaluation for Amorphous Cathodes", Frank Hiltmann et al., p. 4, Table 5, Light Metals, 2002 (6 pages).

* cited by examiner

*Primary Examiner* — Daniel McCracken
(74) *Attorney, Agent, or Firm* — Taylor IP, P.C.

(57) ABSTRACT

A method for the production of graphite bodies, including the step of provisioning a mixture including a high-temperature treated anthracite having a high vitrinite content and provisioning at least one binder coke precursor. The method also includes the steps of forming a green body from the mixture provided in the provisioning step, and carbonizing and graphitizing the green body.

10 Claims, No Drawings

METHOD FOR PRODUCING GRAPHITE BODIES

CROSS REFERENCE TO RELATED APPLICATIONS

This is a continuation of PCT application No. PCT/EP2016/001877, entitled "NOVEL METHOD FOR PRODUCING GRAPHITE BODIES", filed Nov. 11, 2016, which is incorporated herein by reference.

BACKGROUND OF THE INVENTION

1. Field of the Invention

The present invention relates to a method for the production of graphite bodies, as well as the graphite bodies produced therewith.

2. Description of the Related Art

Graphite bodies are for example graphite electrodes and connecting pieces (nipples) for graphite electrodes. The following explanations relate in particular to graphite electrodes and nipples, but also apply correspondingly to graphite bodies other than graphite electrodes or nipples.

Graphite electrodes are used for steel production in an electric arc furnace. Graphite electrodes must withstand diverse mechanical stresses. In addition to temperature induced thermal material stresses, these include the mechanical stresses which arise on insulating elements during tilting of the furnace, due to vibration, due to dislocation of scrap during melting, as well as during placement of the strand into the scrap. In order to withstand the conditions in an electric arc furnace it is therefore essential that the relevant graphite electrode has a low coefficient of thermal expansion, low electrical resistance, sufficient density and the properties associated therewith (strength and E-modulus).

Needle cokes, such as petroleum-based or pitch-based needle cokes are generally used in the production of graphite electrodes. The quality and value of needle coke which has a needle-like crystalline structure is determined by a number of factors such as, for example sulfur and nitrogen content, hardness, ash content, electrical resistance and coefficient of thermal expansion. Although each of these factors is important, the primary measure of quality of needle coke is the linear coefficient of thermal expansion or CTE. In order to be considered premium coke, in other words very high-quality coke, a CTE of less than 0.5 [μm/mK] is generally assumed (measured according to DIN 51 909 of Oct. 1989 in a temperature range of 20° C. to 200° C.). The lower the CTE of the needle coke, the less will be the linear expansion of the graphite electrode produced with this needle coke when used in the electric arc furnace and the greater will be the corresponding thermal shock resistance.

In order to produce graphite bodies, such as graphite electrodes and nipples, two graphitization methods are generally used.

One method—the Acheson-graphitization method—was initially described in US patent document 702,758. The furnace consists of a horizontal bed of refractory materials, furnace heads that carry the current load to the furnace and long side walls, consisting of concrete blocks, steel plates or steel grids. The bottom is cooled by air and loaded with a layer of insulating material, for example granular silicon carbide, metallurgical coke, sand or sawdust. The same materials are used to insulate the side walls and the surface of the furnace.

Due to cheaper production costs however, the second method—the Castner- or lengthwise graphitization method—is the currently commonly used method in the production of graphite electrodes. The material to be graphitized is heated as an ohmic resistance in the direct passage of current to above 2200° C. to 3000° C. The original device for implementation of lengthwise graphitization is the subject of U.S. Pat. No. 1,029,121.

Nipples are used to connect graphite electrodes with one another. The graphite electrodes are herein equipped on their face with threaded boxes into which the nipples are screwed. Production of these nipples occurs generally also on the basis of needle cokes.

Because of the irreversible thermal volume expansion of the needle cokes, the process curve for graphitizing of, for example electrodes or nipples must be adapted very precisely to the parameters of the needle cokes, which results in higher production costs. However, this is the only way to date to reduce the invisible, under the surface defect rate that leads to breakdowns in subsequent use in steel mills.

On the one hand, high quality premium cokes are expensive since they are available only on a limited basis. On the other hand—as previously mentioned—a very defined process curve must generally be applied during graphitizing of premium cokes, resulting in higher production costs.

What is needed in the art is a method for the production of graphite bodies, replacing high quality needle cokes with a more cost-effective base material with which graphite bodies can be produced that have properties that are comparable with high quality needle cokes.

SUMMARY OF THE INVENTION

The present invention provides a method for the production of graphite bodies, comprising the following steps:
  a) Provision of a mixture including high-temperature treated anthracite having a high vitrinite content and at of least one binder coke precursor;
  b) Forming a green body from the mixture provided in step a); and
  c) Carbonizing and graphitizing the green body from step b).

DETAILED DESCRIPTION OF THE INVENTION

According to the invention it has become known that using a base material of high-temperature treated anthracite having a high vitrinite content, and having a CTE of less than 0.5 [μm/mK], for example less than 0.3 [μm/mK], (measured according to DIN 51909 of October 1989 in a temperature range of 20° C. to 200° C.) results in graphite bodies that possess comparable properties to graphite bodies produced from needle cokes.

The anthracites are generally characterized by good availability in both the green state and in the high-temperature treated state and are clearly less expensive compared to high quality needle cokes.

Green anthracite is generally a coal having the highest carbonization level and a reflective surface. Compared to other coals, anthracites are essentially characterized by a low content of volatile components (<10 weight percent (weight-%), a density of approx. 1.3 to 1.4 g/cm$^3$ and a carbon content of >92 weight-%. The energy content ranges from approx. 26 MJ/kg to 33 MJ/kg. The maceral content, that is the content of organic rock-forming components should herein have a collinite content of >20%, for example >50% and a telinit content ≥45%, for example ≥20%.

In the context of the current invention, high-temperature treated anthracite is understood to be an anthracite that was subjected to a thermal treatment in a temperature range of 2200 to 3000° C., for example 2300 to 2800° C., for example 2400 to 2600° C. For thermal treatment of anthracites, all furnace technologies are basically suitable with which a thermal treatment of 2200° C. and higher is feasible, for example an electro-calcination, an Acheson-graphitization process or a lengthwise graphitization.

With this high-temperature treatment at 2200 to 3000° C., the x-ray amorphous structure of the anthracite can be transformed into a graphite like structure. An x-ray amorphous structure is characterized in that the long-range coverage is below the coherence length of the x-ray radiation that is used.

Even though the various types of anthracites graphitize in a similar manner during the above referenced high-temperature thermal treatment, the materials display different CTE-values after graphitization.

In order to achieve a low CTE-value, that is a CTE-value of less than 0.5 [µm/mK], for example less than 0.3 [µm/mK] (measured according to DIN 51909 of October 1989 in a temperature range of 20° C. to 200° C.) it is necessary to use a high-temperature treated anthracite having a high vitrinite content as the base material in the production of graphite bodies.

The term "Vitrinite content or Vitrinite factor" is explained for example on page 4, table 5 in the publication by F. Hiltmann et al—"Anthracite Evaluation for Amorphous Cathodes", Light Metals, 2002. Vitrinite as morphological component of coal is composed of telinit, the previous plant cell walls and collinite, the cell filling. The ribbon-like structure of this coal component is typical. Fanning out of this ribbon structure in the range of the graphitizing temperatures of higher than 2200° C. explains the lower CTE of these graphite types. In the context of the current invention, the vitrinite content as the sum of the collonite and telinit content may amount to >60%, for example >70%.

In addition to the comparable or lower CTE-values, additional properties such as density, sulfur or nitrogen content are also improved compared to the needle cokes. This is also reflected in a lower volume expansion and in an expansion gradient that consistent with the series of needle cokes.

Below, the term "high-temperature treated anthracite" is used that can be equated with high-temperature treated anthracite having a high vitrinite content.

A binding agent is usually a coal tar pitch or petroleum pitch which, when mixed with a granular carbon material results in a mixed carbon material. Binder coke is a component of carbon products, resulting from coking of the binder coke precursor during an annealing process.

According to the invention, binder coke precursors can be selected from the group consisting of pitch, tar, bitumen, phenol resin, furan resin or any mixture thereof. Pitch such as coal tar pitch may be used.

The high-temperature treated anthracite and at least one binder coke precursor are mixed and kneaded. In the present invention, the term "provision of a mixture" includes the steps of mixing and kneading. This mixture contains 70 to 95 weight percent (weight-%), for example 77 to 87 weight-% of anthracite and 5 to 30 weight-%, for example 13 to 23 weight-% of the at least one binder coke precursor. The weight-% specifications relate to the green mixture, in other words, the components of this mixture always result in 100 weight-%. The resulting mixture is subsequently formed. According to the present invention, an optional compression is included during forming. Forming and optional compression can occur for example through extrusion, pressing, i.e. isostatic pressing, vibratory compaction, i.e. shaking under vacuum. A formed green body results in which the particles are aligned, for example through extrusion to provide anisotropy, in other words a desired direction in the material. This can be advantageous for later use in the electric arc. Lower resistance occurs for example in longitudinal direction of the electrode.

In a subsequent step of the method, the shaped green body may be carbonized at 700 to 1300° C. and graphitized at 2200 to 3000° C. After carbonization an optional impregnation step with pitch can occur, for example at 70 to 180° C. After this impregnation step, a carbonization step may again be implemented. This change from carbonization to impregnation step may occur up to 2 times before the graphitization step is implemented. Impregnation increases the strength of the graphite body, for example a graphite electrode.

According to another embodiment of the present invention, up to 50 weight-%, for example up to 25 weight-% of high-temperature treated anthracite can be replaced in step a) of the method of the present invention with petroleum-based and/or coal tar pitch-based needle coke, resulting in a mixture consisting of this anthracite and the appropriate needle coke(s). The addition of needle coke compensates for the higher electric resistance in longitudinal direction of the graphite body that is due to the isotropy of the high-temperature treated anthracite. 5 to 30 weight-%, for example 15 to 25 weight-% of at least one binder coke precursor are added to this mixture. The weight percentage references relate to the green mixture. In other words, the components of this mixture always amount to 100 weight-%. If a mixture of petroleum-based and/or coal tar pitch-based needle coke is used in order to replace parts of the high-temperature treated anthracite, then this mixture is present in a ratio of 4:1-1:4, for example 1:1.

According to another embodiment of the current invention, the high-temperature treated anthracite and if necessary the petroleum-based and/or coal tar pitch-based needle coke is graded prior to metering. Grading means separation according to certain particle sizes. Due to the separation according to certain particle sizes it is possible to produce an as dense an electrode as possible, since herein the suitable amounts of various particle sizes can be selected in order to achieve dense packing.

The high-temperature treated anthracite and, if necessary, the petroleum-based and/or coal tar pitch-based needle coke may be reduced in size to particles prior to metering and/or grading. Within the scope of the present invention, the aforementioned particles that are used for a green mixture have a maximum diameter of up to 25.0 mm, for example of up to 20.0 mm, for example up to 15.0 mm. One advantage of these predefined diameters can be the achievement of high density or respectively low porosity.

Furthermore, graphite bodies can be available through the method of the present invention. These graphite bodies can be in the embodiment of graphite electrodes or nipples. In operation, that is during use in an electric arc furnace, these graphite bodies display a surprisingly exceptional service behavior, since tears in the material are hardly detectable.

The following example serves to further explain an embodiment of the present invention.

In one embodiment 100 parts anthracite having a vitrinite content of 77.5% which was pretreated at 2400° C. can be extruded with 30 parts pitch to a green molded body, carbonized at 1200° C. and graphitized at 2800° C. The CTE can be at 0.2 [μm/Mk]. The sulfur content may be at only 0.22% and the nitrogen content at less than 0.10%.

A reference sample with 100 parts of a pitch-based needle coke was mixed according to the aforementioned method with 23 parts pitch, carbonized and graphitized. The CTE is at 0.25 [μm/mK] and thus higher than in the embodiment according to the method of the present invention. The sulfur content at 0.45% is also clearly higher, as well as the nitrogen content at 0.188%.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method for the production of graphite bodies, comprising the following steps:
   a) provisioning a mixture including a high-temperature treated anthracite having a high vitrinite content and provisioning at least one binder coke precursor;
   b) forming a green body from said mixture provided in step a); and
   c) carbonizing and graphitizing said green body from step b), wherein a share of the high-temperature treated anthracite is 70 to 95 weight-% and a share of said at least one binder coke precursor is 5 to 30 weight-%.

2. The method according to claim 1, wherein in step c) following carbonization and prior to graphitization, there is included a step of impregnating said green body with a pitch.

3. The method according to claim 2, wherein up to two steps of impregnating said green body with the pitch occur.

4. The method according to claim 1, wherein said at least one binder coke precursors is selected from a group consisting of at least one of a pitch, a tar, a bitumen, a phenol resin, and a furan resin.

5. The method according to claim 1, wherein up to 50 weight-% of the high-temperature treated anthracite is replaced with at least one of a petroleum-based and a coal tar pitch-based needle coke.

6. The method according to claim 5, wherein at least one of the high-temperature treated anthracite, said petroleum-based needle coke, and said coal tar pitch-based needle coke are graded prior to metering.

7. The method according to claim 6, wherein at least one of the high-temperature treated anthracite, said petroleum-based needle coke, and said coal tar pitch-based needle coke are reduced in size to a plurality of particles prior to at least one of metering and grading.

8. The method according to claim 7, wherein said plurality of particles have a maximum diameter of up to 25.0 mm.

9. A plurality of graphite bodies obtained by a method, comprising the steps of:
   a) provisioning a mixture including a high-temperature treated anthracite having a high vitrinite content and provisioning at least one binder coke precursor;
   b) forming a green body from said mixture provided in step a); and
   c) carbonizing and graphitizing said green body from step b), wherein a share of the high-temperature treated anthracite is 70 to 95 weight-% and a share of said at least one binder coke precursor is 5 to 30 weight-%.

10. The plurality of graphite bodies of claim 9, wherein said plurality of graphite bodies is in the form of a plurality of graphite electrodes or a plurality of graphite nipples.

* * * * *